United States Patent
Balraj et al.

(10) Patent No.: US 7,376,782 B2
(45) Date of Patent: May 20, 2008

(54) INDEX/DATA REGISTER PAIR FOR INDIRECT REGISTER ACCESS

(75) Inventors: Jasper Balraj, Beaverton, OR (US);
Geetani R. Edirisooriya, Tempe, AZ (US); John P. Lee, Tempe, AZ (US);
Robert Strong, Folsom, CA (US);
Jeffrey L. Rabe, Gold River, CA (US);
Amber Huffman, Banks, OR (US);
Daniel Nemiroff, Folsom, CA (US);
Rajeev Nalawadi, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 373 days.

(21) Appl. No.: 11/172,254

(22) Filed: Jun. 29, 2005

(65) Prior Publication Data

US 2007/0005869 A1 Jan. 4, 2007

(51) Int. Cl.
*G06F 12/00* (2006.01)

(52) U.S. Cl. .................... 711/2; 711/203; 711/206; 711/171; 711/200

(58) Field of Classification Search .............. 711/2, 711/203, 206, 208, 200, 171
See application file for complete search history.

(56) References Cited

U.S. PATENT DOCUMENTS 5,642,491 A * 6/1997 Rose et al. ................. 711/2
5,913,058 A * 6/1999 Bonola ...................... 713/2
6,760,827 B2 * 7/2004 Moore ....................... 711/171

* cited by examiner

*Primary Examiner*—Kimberly Mclean
(74) *Attorney, Agent, or Firm*—Blakely, Sokoloff, Taylor & Zafman LLP

(57) ABSTRACT

A computer system provides a program access to a first register during real mode operation by using an index register and a data register, wherein the index register and the data register are located in real mode memory space and the first register is located outside of real mode memory space.

12 Claims, 4 Drawing Sheets

INDEX/DATA REGISTER PAIR FOR INDIRECT REGISTER ACCESS

FIELD

Embodiments of the invention relate generally to AHCI register access and, more specifically, access to AHCI registers using an index-data register pair during real-mode operation.

BACKGROUND

As more people are networked through their machines, transmitting, receiving and storing vital information, information technology departments face greater challenges keeping those networks operational and often from remote locations. In many instances, the network server needs to be rebooted in order to resolve issues or in the course of routine maintenance. When a computer (e.g., server) is booted up, an operating system is loaded into the computer's main memory. Once loaded users may run applications, or in case of a server, network services and applications are started to service its respective client machines. Additionally, for PC based systems, after booting up, the system may utilize a memory mapped I/O (MMIO) base address register located above one megabyte (1 MB) to access all available AHCI (advanced host controller interface) registers connected to a multitude of SATA (serial advanced technology attachment) devices.

In PC (personal computer) based systems, programs such as BIOS (basic input/output system), option ROMs (read-only memory), OSs (operating systems), or other programs are written to start up in 'real mode' (e.g., Intel's® 8086 mode). In real mode, a program cannot access memory above 1 MB. Because the MCH (memory controller hub—north-bridge) doesn't forward memory mapped I/O spaces above 1 MB down to ICH (I/O controller hub—south-bridge) and the memory space below 1 MB is also the main memory of the system, there is no memory to be allocated to AHCI accesses. Therefore, a real mode program is limited to using the IOBARs (0-4) (I/O base address registers) to access SATA devices; this limits the number of available devices it can access for boot up or any other purpose to 4.

BRIEF DESCRIPTION OF THE DRAWINGS

Disclosed embodiments of the invention are illustrated by way of example, and not by way of limitation, in the figures of the accompanying drawings, in which like references indicate similar elements and in which.

DETAILED DESCRIPTION

In the following description, numerous specific details are set forth. However, it is understood that embodiments of the invention may be practiced without these specific details. In other instances, well-known circuits, structures and techniques have not been shown in detail in order not to obscure the understanding of this description.

Figure 1:
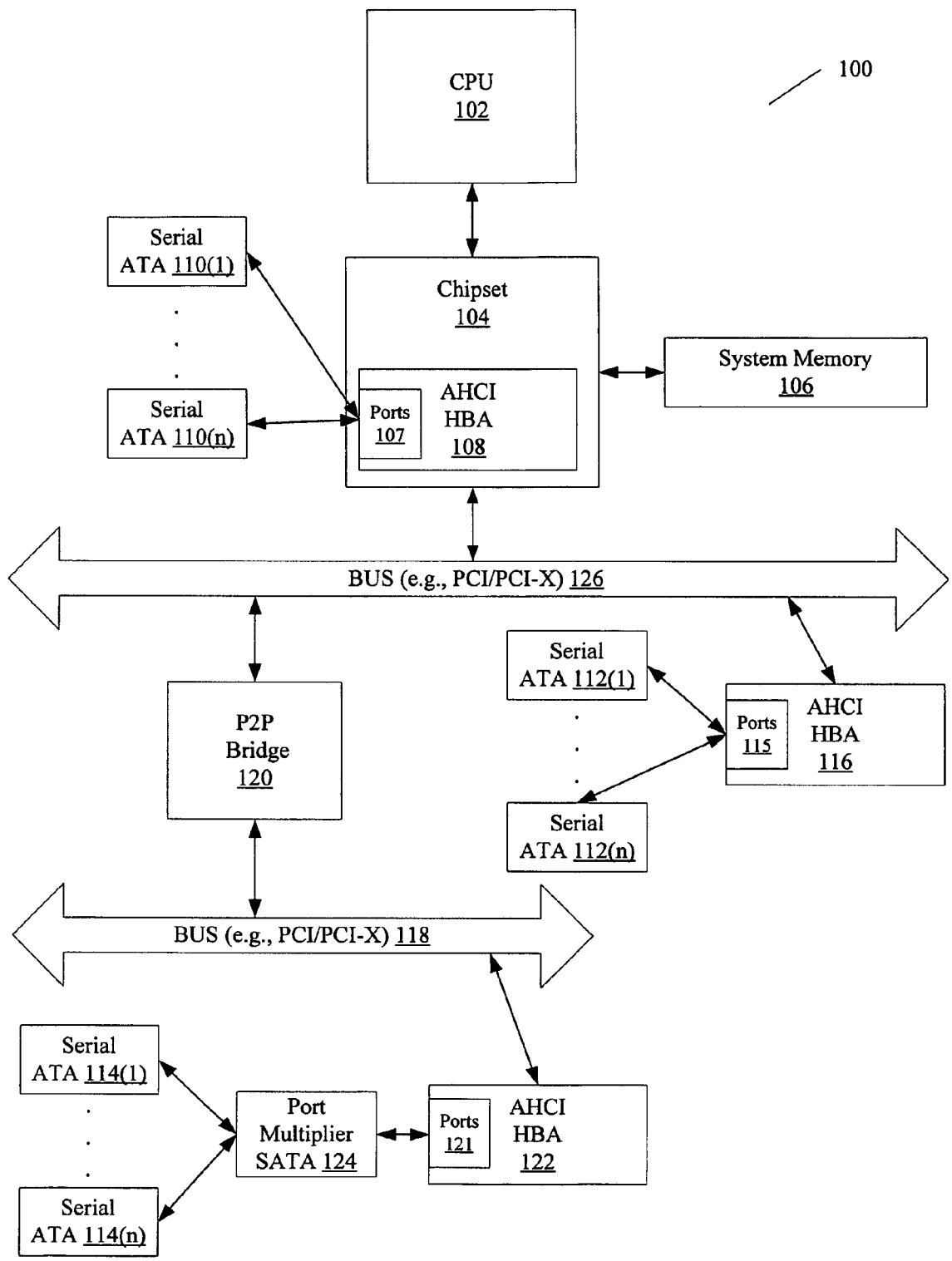
FIG. 1 is a diagram illustrating a computer system according to one embodiment of the invention.

FIG. 1 is a diagram illustrating a computer system 100 according to one embodiment of the invention. The computer system 100 includes a central processing unit (CPU) 102, a chipset 104 connected to system memory 106, and busses 118 and 126.

The CPU 102 represents a central processing unit of any type of architecture, such as embedded processors, microcontrollers, digital signal processors, superscalar computers, vector processors, single instruction multiple data (SIMD) computers, complex instruction set computers (CISC), reduced instruction set computers (RISC), very long instruction word (VLIW), or hybrid architecture. In one embodiment, the CPU 102 is compatible with the Intel Architecture (IA) processor, such as the IA-32 and the IA-64. The CPU 102 typically contains a number of control registers to support memory management tasks such as virtual memory and cache memory. These tasks may include paging and segmentation.

Figure 2:
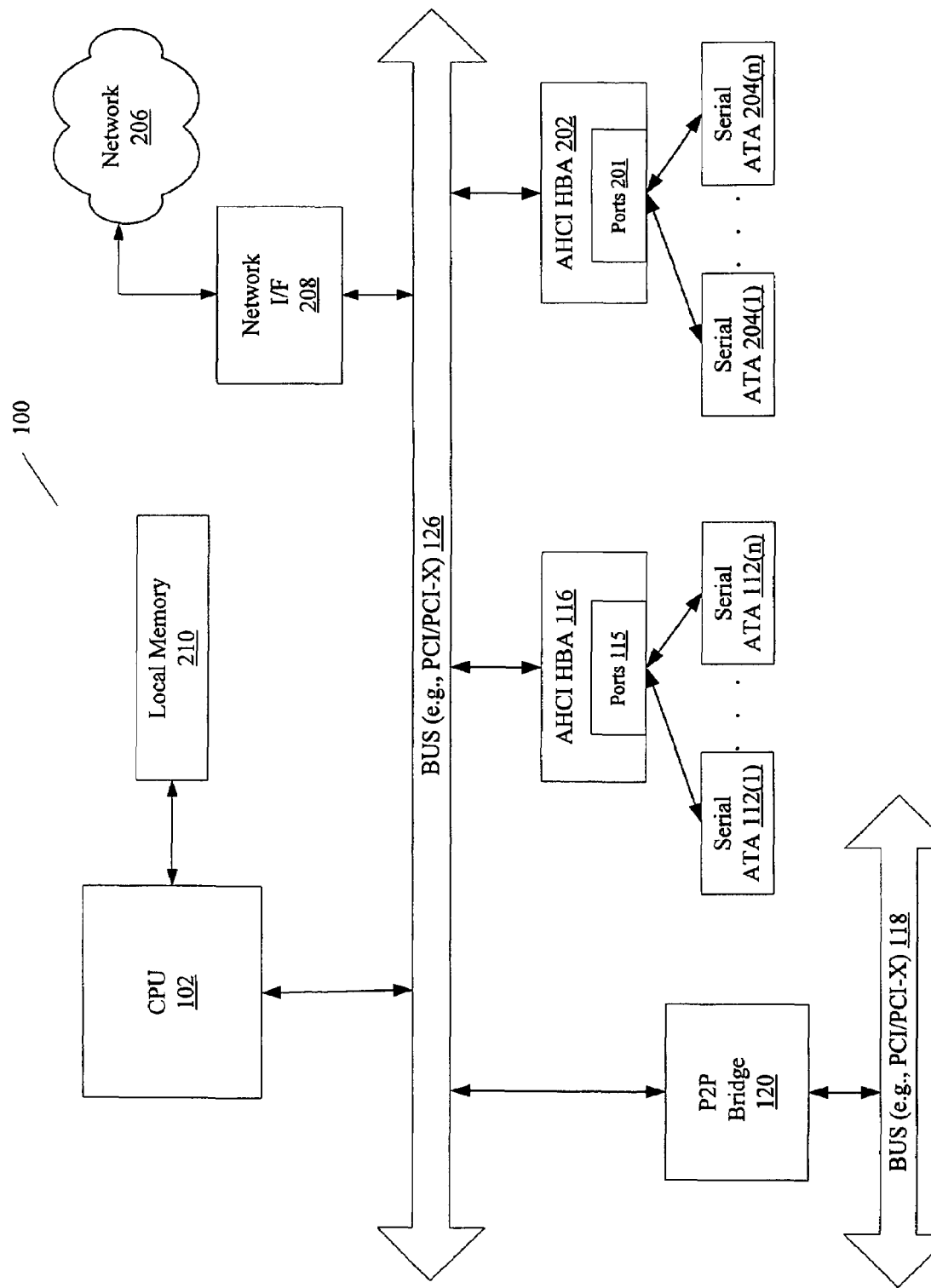
FIG. 2 is a diagram illustrating a computer system according to an embodiment of the invention.

The bus 118, 126 provides an interface medium to allow the CPU 102 to communicate with other processors or devices. The CPU 102 may be coupled to the bus 118, 126 through other devices such as chipset 104 or PCI-PCI bridge 120, as illustrated in FIG. 2. The bus 118, 126 may support a uni-processor or multiprocessor configuration and may be parallel, sequential, pipelined, asynchronous, synchronous, or any combination thereof.

AHCI-HBA (advanced host controller interface-host bus adapter) (e.g., 108, 116, 122) is a hardware mechanism that allows programs to communicate with SATA (serial advanced technology attachment) devices 110(1-*n*), 112(1-*n*), and 114(*l*-*n*)—for simplicity, hereinafter referred to as, "SATA devices 110, 112, 114." SATA devices 110, 112, 114 may be a physical device such as a hard disk drive or an optical disk drive that is either directly attached to one port of a multitude of AHCI-HBA ports 107, 115 of AHCI-HBA 118, 116 respectively, or is attached through a port multiplier 124 connected to an AHCI-HBA port 121 found in AHCI-HBA 122. Additionally, it can be appreciated by those skilled in the art that references to "programs" herein are computer readable instructions that may be implemented in software, firmware, or hardware on a multitude of corresponding mediums such as hard disk, compact disc, EPROMs, etc.

AHCI-HBA 108, 116, 122 is a PCI (peripheral component interconnect) class device that acts as a data movement engine between system memory and serial ATA devices (110, 112, 114). AHCI-HBA 108, 116, 122 host devices may support from 1 to 32 ports and also supports ATA and ATAPI (ATA programming interface) devices, and PIO (programmed I/O) and DMA (direct memory access) protocols. AHCI-HBA 108, 116, 120, 122 may optionally support a command list on each port for overhead reduction, and to support serial ATA native command queuing via the FPDMA queued command protocol for each device of up to 32 entries, or in other words, access to 32 devices. In another embodiment, AHCI-HBA 108, 116, 122 may optionally support 64-bit addressing, which provides access to a larger memory space.

However, as discussed above, during a boot up cycle, and more specifically, a program executing in 'real mode' cannot access AHCI's memory mapped I/O space above 1 MB. In other words, programs written to operate in real mode are unable to access registers in a PCI function's address space if the address space is memory mapped and above 1 MB and can only access up to four devices using the registers, IOBAR (0-4). These registers and other registers pertaining to embodiments of the invention are set forth below.

Physical register memory is implemented in each AHCI-HBA 108, 116, 122. For example, Table 1 illustrates an embodiment of a PCI header that may be constructed for AHCI-HBA 108, 116, 122. The fields as set forth in Table 1 show the physical location, symbol, and name of each AHCI-HBA 108, 116, 122 register. In one embodiment, a portion of these registers may be utilized to indirectly access AHCI registers in memory space outside real mode memory space (>1 MB) by identifying an index/data register pair in real mode memory space for use by a program to perform read and write operations to the AHCI register attached to an SATA device (e.g., 112, 114, 116). Details regarding the specific use of the registers are set forth below in the description accompanying FIG. 3.

TABLE 1

PCI Header Table

| Start (hex) | End (hex) | Symbol | Name |
| --- | --- | --- | --- |
| 00 | 03 | ID | Identifiers |
| 04 | 05 | CMD | Command Register |
| 06 | 07 | STS | Device Status |
| 08 | 08 | RID | Revision ID |
| 09 | 0B | CC | Class Codes |
| 0C | 0C | CLS | Cache Line Size |
| 0D | 0D | MLT | Master Latency Timer |
| 0E | 0E | HTYPE | Header Type |
| 0F | 0F | BIST | Built In Self Test (Optional) |
| 10 | 23 | BARS | Other Base Address Registers <BAR0-4> |
| 24 | 27 | ABAR | AHCI Base Address <BAR5> |
| 2C | 2F | SS | Subsystem Identifiers |
| 30 | 33 | EROM | Expansion ROM Base Address |
| 34 | 34 | CAP | Capabilities Pointer |
| 3C | 3D | INTR | Interrupt Information |
| 3E | 3E | MGNT | Min Grant (Optional) |
| 3F | 3F | MLAT | Max Latency (Optional) |
| SATACAP | SATACAP + 3 | SATACR0 | Serial ATA Capability Register 0 |
| SATACAP + 4 | SATACAP + 7 | SATACR1 | Serial ATA Capability Register 1 |

In one embodiment, the AHCI-HBA 108 is integrated in the chipset 104. In another embodiment AHCI-HBA 116 sits off the first available PCI bus 126. In yet another embodiment, AHCI-HBA 122 sits off a second PCI bus 118 that exists behind a PCI-PCI (P2P) bridge 120. AHCI-HBA 122 may have one port attached to a port multiplier 124. PCI is used herein as a reference name and may be any PCI-like bus, such as PCI-X, PCI-Express, HyperTransport, etc. Compliance with non-PCI specifications is dependant upon those specifications being compliant and/or compatible with PCI.

FIG. 2 is a diagram illustrating another embodiment of computer system 100 operating in a networked environment. FIG. 2 has substantially the same components of FIG. 1 and includes local memory 210, an AHCI-HBA 202 and corresponding SATA devices 204 (1-*n*), network 206, and network interface 208. AHCI-HBA 202 and 116 are connected to the CPU 102 through bus 126 and to SATA devices 204 (1-*n*), 112 (1-*n*) through port 115 and port 201, respectively. The CPU 102 connects directly to local memory 210. This configuration may support a RAID (redundant array of independent disks) environment connected to network 206 through network interface 208. In one embodiment, the SATA devices 204 (1-*n*), 112 (1-*n*) are RAID devices and an index/data pair register may be used to allow a program executing on computer system 200 to boot up or otherwise access these devices through their corresponding AHCI-HBA 116, 202 registers during real mode operation. In another embodiment, computer system 200 may use the index/data pair register to boot up. Details describing the utilization of the index/data pair register are set forth below.

Figure 3:
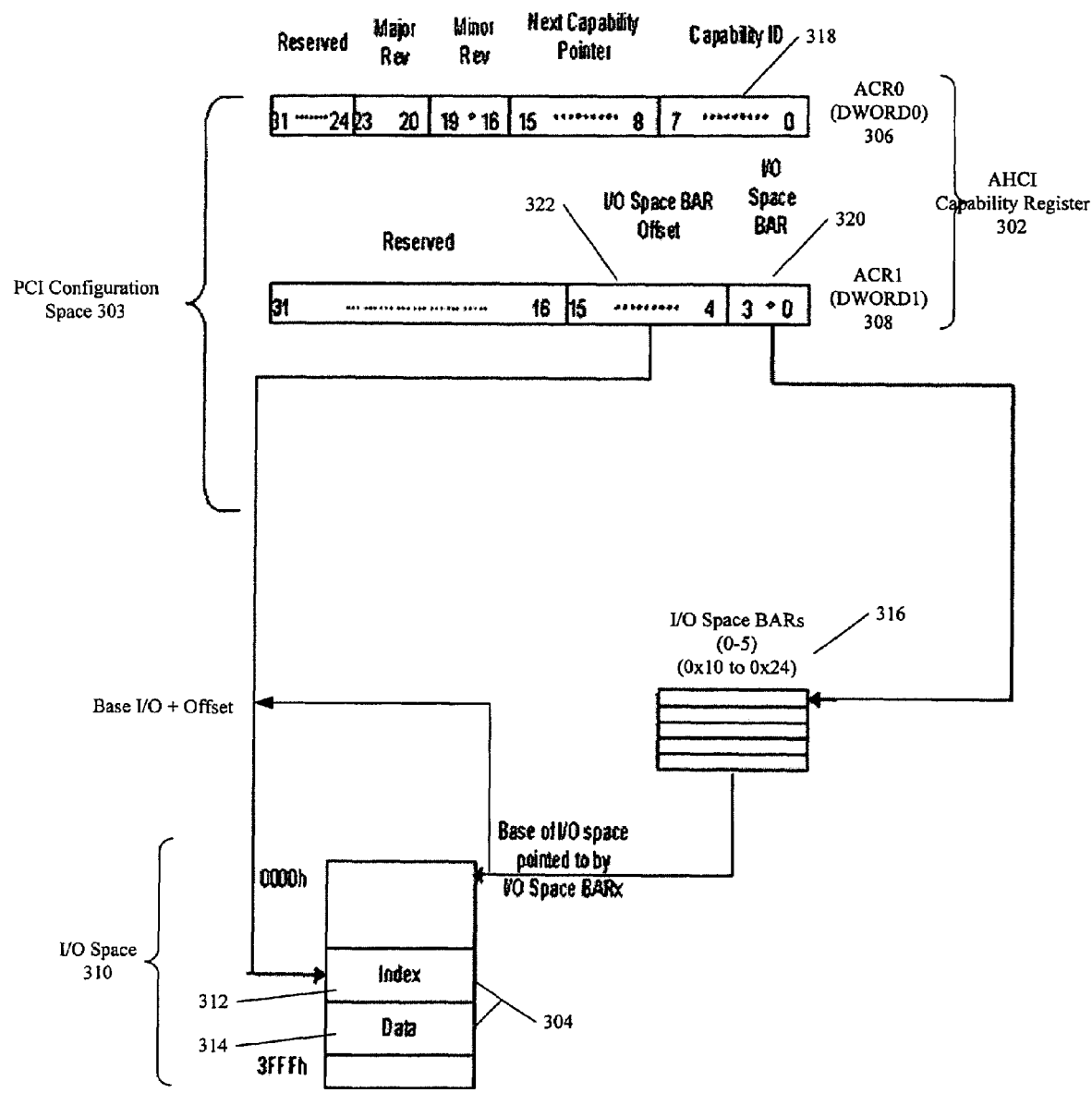
FIG. 3 is a diagram illustrating an AHCI capability register and an index/data pair register.

FIG. 3 is a diagram illustrating an AHCI capability register 302 and an index/data pair register 304. The AHCI capability register 302 is located in PCI configuration space 303 and includes ACR0 306 (DWORD 0) and ACR1 308 (DWORD 1). The index/data pair register 304 is located in I/O space 310 and includes an index register 312 and a data register 314. The I/O space 310 is accessible by a program executing in real mode because these spaces are within the 1 MB limitation of real mode execution. The PCI configuration space 303 is accessed by using standard PCI configuration method described in the PCI specification. Although the registers exemplified herein are illustrated with a data length of a double word (DWORDX=4 bytes), it can be appreciated by those skilled in the art that other embodiments may include varying data lengths (e.g., 8 bytes) and is not to be considered limiting.

The use of the index/data pair register 304 allows the program to access all AHCI registers (e.g., AHCI-HBA 108, 116, 122, registers) in real mode using indirect I/O addressing without having to use the memory mapped AHCI base address register (See ABAR in Table 1). In one embodiment, one of the I/O space BAR set 316 and an offset value may be used to identify two DWORDS—corresponding to the index register and data register—of I/O space 306 allocated for the indirect I/O addressing.

Prior to identifying the index/data pair register 304, the program determines whether or not the AHCI-HBA 108, 116, 122, supports indirect addressing using the index/data pair register 304. This may be accomplished through an examination of the PCI configuration space 303 and in particular the AHCI capability register 302. In one embodiment, the program reads the capability ID 318 (bits 0:7) of ACR0 306. The program may then compare the value of the capability ID 318 read from ACR0 306 to determine if the indirect addressing feature is available. There may be a multitude of values that indicate the indirect addressing feature. For example, a first value may indicate the indirect addressing feature plus a second feature and a second value may indicate the indirect addressing feature plus a third and/or fourth feature.

After determining indirect addressing is available, the program may then read ACR1 308 and more specifically I/O space BAR value 320 (bits 0:3) and I/O space BAR offset value 322 (bits 4:15). The I/O space BAR value 320 indicates which I/O space BAR of the I/O space BAR set 316 provides a starting base address used along with the I/O space BAR offset value 322 to determine the address in I/O space 310 of the index/data pair register 304. Some exemplary values corresponding to the I/O space BAR value 320 (bits 0:3) and I/O space BAR offset value 322 (bits 4:15) are shown in Table 2 below.

TABLE 2

ACR1 308

| Bit | Type | Description |
|---|---|---|
| 31:16 | RO | Reserved, must return zero when read |
| 15:04 | RO | BAR Offset (BAROFST): Indicates the offset into the BAR where the Index/Data pair are located (in Dword granularity). A value of 004h indicates offset 10h.<br>000h = 00h offset<br>001h = 04h offset<br>002h = 08h offset<br>003h = 0Ch offset<br>004h = 10h offset<br>. . .<br>FFFh = 3FFFh offset (max 16 KB) |
| 3:0 | RO | BAR Location (BARLOC): Indicates the offset of the BAR containing the Index/Data pair (in Dword granularity). A value of 8h indicates offset 20h<br>0000-0011b = reserved<br>0100b = 10h => BAR0<br>0101b = 14h => BAR1<br>0110b = 18h => BAR2<br>0111b = 1Ch => BAR3<br>1000b = 20h => BAR4<br>1001b = 24h => BAR5<br>1010-1111b = reserved<br>1111b = Index/Data pair is implemented in PCI Configuration space |

In other embodiments different bit positions and number of bits may be used. For example, I/O space bar offset may be bits 4:19 for a total of 16 bits.

In one embodiment, the program calculates the index/data pair register 304 address based on the I/O space BAR offset value 322 and the base address value as determined by the I/O space BAR value 320. Because the index/data pair register 304 is pointed to by an I/O space bar (e.g., an one I/O space BARs 316), it is in the I/O space 310 (<1 MB) and not in the MMIO space (>1 MB) and thus accessible in real mode operation. Read and/or write operations to the index/data pair register 304 will be forwarded to the ICH (south-bridge) by the MCH (north-bridge) since the index/data pair register 304 is in the I/O space 310 below 1 MB and not in the MMIO space.

The program writes the AHCI register index into the index register 312 and data is written into an AHCI register pointed to by the index register 312 if it is a write operation and the contents of the AHCI register are returned to the program if it is a read operation. The AHCI register pointed to by the index register 312 is associated with an SATA device (e.g., 110(1-n) et. al), which in various embodiments may be a hard disk, CDROM, tape drive, etc.

In one embodiment, the data register 314 is a virtual register or a "window" to the AHCI register pointed to by the index register 312. In other words, the data register 314 is not a physical register and the data is actually stored in the memory mapped AHCI register.

Figure 4:
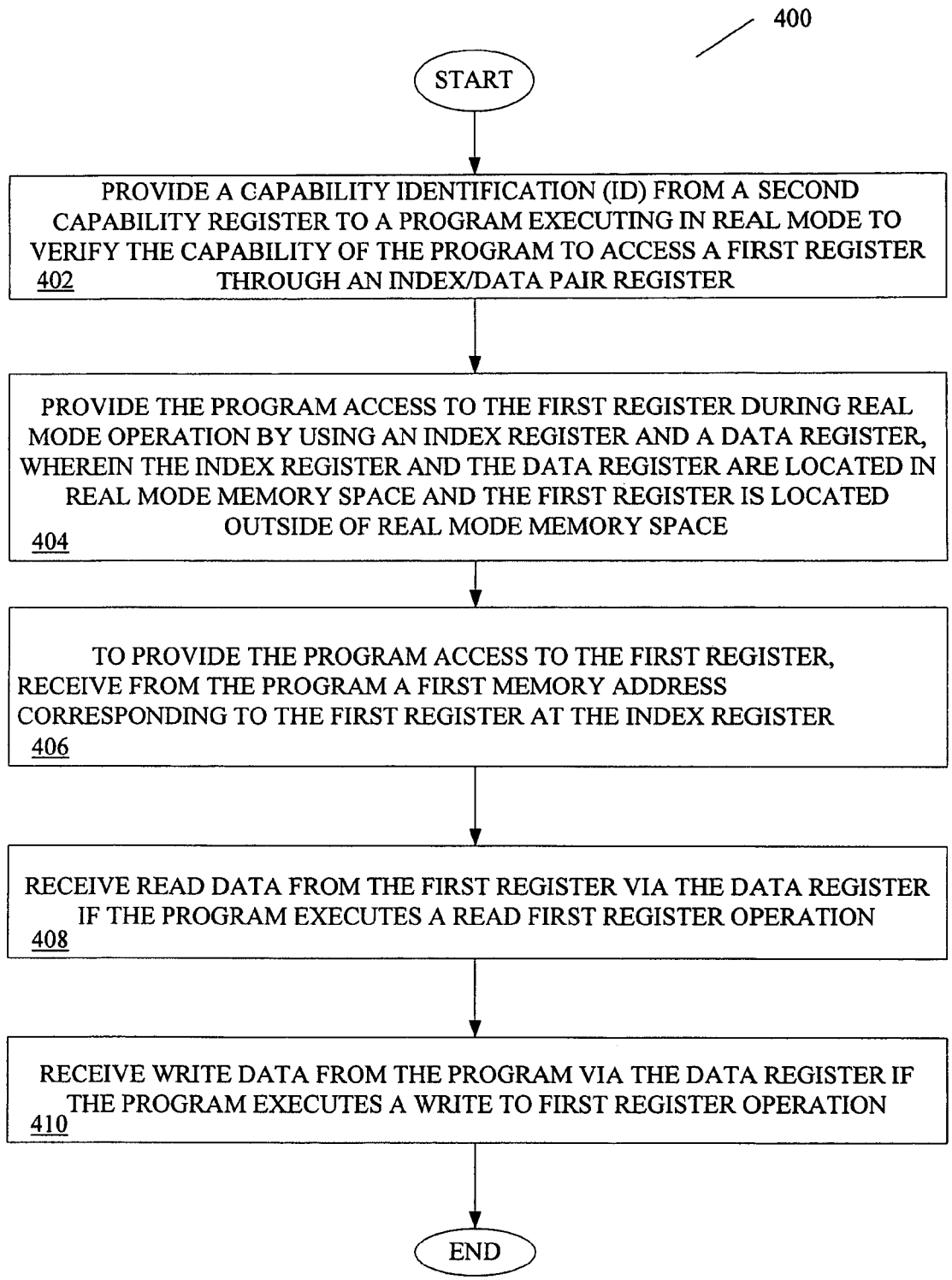
FIG. 4 is a flow chart illustrating a method for a program to access AHCI registers using the index-data register pair during real-mode operation.

FIG. 4 is a flow chart illustrating a method for a program to access AHCI registers using the index-data register pair 304 during real-mode operation. At operation 402, a second capability register provides a capability identification (ID) to a program executing in real mode to verify the capability of the program to access a first register (e.g., an AHCI register in memory mapped I/O space) through the index/data pair register 304. Once verified, at operation 404, the computer system 100 provides the program access to the first register during real mode operation by using an index register 312 and a data register 314, wherein the index register 312 and the data register 314 are located in I/O space 310 (real mode memory space) and the first register is located in memory mapped I/O space (outside of real mode memory space—>1 MB). At operation 406, the index register 312 receives a first memory address corresponding to the first register from the program. If the program executes a read operation, at operation 408, data is read from the data register 314. If the program executes a write operation, at operation 410, data is written to the data register 314. In one embodiment, the data register 314 is a virtual register or window to the actual data, which is read from a portion of the first register. In one embodiment, the data register 314 is a virtual register or window to the actual data, which is read from or written to a portion of the first register.

In the preceding description, for purposes of explanation, specific nomenclature is set forth to provide a thorough understanding of various embodiments of the invention. However, it will be apparent to one skilled in the art that these specific details are not required in order to practice embodiments of the invention. Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent set of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the preceding discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

A system and method for accessing AHCI registers using an index-data register pair during real-mode operation have been described. It will be appreciated that the embodiments of the invention described above are cited by way of example, and are not limited to what has been particularly shown and described hereinabove. Rather, the scope of embodiments of the invention may include both combinations and subcombinations of the various features described hereinabove, as well as variations and modifications thereof which would occur to persons skilled in the art upon reading the foregoing description and which are not disclosed in the prior art.

What is claimed is:

1. A method, comprising:
providing a program access to a first register during real mode operation by using an index register and a data register, wherein the index register and the data register are located in real mode memory space and the first register is located outside of real mode memory space, wherein an address of the index register is based on a first bit group corresponding to an input/output (I/O) space bar address register having a base address value and a second bit group corresponding to an offset value; and
storing the address of the index register in a first capability register.

2. The method of claim 1, comprising computing the address of the index register by adding the offset value to the base address value.

3. The method of claim 1, wherein the first bit group is bits zero to three of the first capability register and the second bit group is bits four to 15 of the first capability register.

4. The method of claim 1, wherein the index register is a lower X/2 bit word and the data register is an upper X/2 bit word of an X bit register.

5. The method of claim 4, wherein the X bit register is one of a 32 bit register or a 64 bit register.

6. The method of claim 1, further comprising providing a capability identification (ID) from a second capability register to the program to verify capability of access to the first register.

7. The method of claim 1, further comprising:
if a write operation, receiving write data at the data register from the program and forwarding the write data to the first register associated with an I/O port; and
if a read operation, receiving read data at the data register from the first register associated with an I/O port and forwarding the read data to the program.

8. An apparatus, comprising:
a first capability register read by a program to provide the program a location to an index register and a data register in real mode memory space;
the index register to receive from the program an address of a first register outside real mode memory space, wherein the first register is an advanced host controller interface (AHCI) register and is mapped in memory mapped I/O (MMIO) space, and wherein the AHCI register corresponds to 1 of 32 serial advanced technology attachment (SATA) devices; and
the data register to receive at least one of write data from the program or read data from the first register according to program execution.

9. The apparatus of claim 8, wherein the index register is a lower X/2 bit word and the data register is an upper X/2 bit word of an X bit register.

10. The apparatus of claim 9, wherein the X bit register is one of a 32 bit register or a 64 bit register.

11. The apparatus of claim 8, further comprising a second capability register to provide the program with a capability identification (ID) to verify capability to access to the first register outside real mode memory space.

12. A system, comprising:
a memory module;
a processor to access data stored in the memory module to provide a program access to a first register during real mode operation through an index register and a data register, wherein the index register and the data register are located in real mode memory space and the first register is located outside of real mode memory space, the data register to receive at least one of write data from the program or read data from the first register according to program execution; and
a network interface device associated with the first register located outside of the real mode memory space to communicatively couple, via the index register and data register, the program to a data input/output device coupled to the network interface device
a first capability register read by the program to provide the program a location to the index register in real mode memory space, wherein the first capability register comprises a base address value and an offset address value; wherein the base address value corresponds to an address associated with one of a plurality of input/output (I/O) space base address registers (BARs).

* * * * *